United States Patent
Agnihotri et al.

(10) Patent No.: US 6,771,885 B1
(45) Date of Patent: Aug. 3, 2004

(54) METHODS AND APPARATUS FOR RECORDING PROGRAMS PRIOR TO OR BEYOND A PRESET RECORDING TIME PERIOD

(75) Inventors: Lalitha Agnihotri, Fishkill, NY (US); Nevenka Dimitrova, Yorktown Heights, NY (US); Thomas McGee, Garrison, NY (US); Nicholas J. Mankovich, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/498,884

(22) Filed: Feb. 7, 2000

(51) Int. Cl.[7] ........................... H04N 5/91; H04N 7/173
(52) U.S. Cl. ............................................. 386/83; 725/87
(58) Field of Search ............................... 386/83, 46–52, 386/55, 4, 94, 95, 96, 111, 109, 112; 725/86, 87, 101, 102, 19, 39; H04N 5/91, 7/173

(56) References Cited

U.S. PATENT DOCUMENTS

| | | |
|---|---|---|
| 4,697,209 A * | 9/1987 | Kiewit et al. |
| 5,440,400 A * | 8/1995 | Micheron et al. ............. 386/39 |
| 5,659,653 A | 8/1997 | Diehl et al. .................... 386/46 |
| 5,758,009 A | 5/1998 | Hashimoto et al. ........... 386/83 |

FOREIGN PATENT DOCUMENTS

EP    0627857    12/1994    .......... H04N/7/087

OTHER PUBLICATIONS

N. Dimitrova et al. Content–Based Video Retrieval by Example Video Clip, 1997, p. 59–70, XP000923334.
N. Dimitrova et al. Video Keyframe Extraction and Filtering, Nov. 10, 1997, pp. 113–120, XP000775302.
Dimitrova et al., "Content–Based Video Retrieval by Example Video Clip", proceedings of Storage and Retrieval for image and Video database V, SPIE vol. 3022, pp. 59–70, San Jose, CA, 1997.

* cited by examiner

*Primary Examiner*—Robert Chevalier

(57) ABSTRACT

A video signal is processed to generate one or more signatures associated with a broadcast program to be recorded by a recording device. The signatures are then processed to determine an actual start time and end time of the desired broadcast program, such that the program can be properly recorded despite delays or other changes in a pre-scheduled broadcast time of the program. One or more of the extracted signatures may be based at least in part on, e.g., a keyframe similarity measure, a histogram, one or more detected commercials, a transcript, a program logo or other detected object, detected text, and a sign-on or sign-off of the desired program. Other types of signatures can also be used.

20 Claims, 1 Drawing Sheet

METHODS AND APPARATUS FOR RECORDING PROGRAMS PRIOR TO OR BEYOND A PRESET RECORDING TIME PERIOD

FIELD OF THE INVENTION

The present invention relates generally to video signal processing, and more particularly to techniques for recording broadcast programs or other types of video signals.

BACKGROUND OF THE INVENTION

Conventional videocassette recorders (VCRs) and other types of video recording devices are generally provided with the capability of recording a broadcast, program for a preset recording time period. For example, a user may program such a device to record a broadcast program on a particular channel at a particular time, e.g., to record a two-hour movie scheduled to appear on channel 6 from 10pm–12pm on Nov. 25, 1999. A similar effect may be achieved by entering a so-called VCR+ code, which is a simpler approach in that it avoids the need for a user to enter specific information such as channel, date and time.

A significant problem with these and other conventional recording techniques is that the actual broadcast time of the desired program to be recorded often does not correspond exactly to its pre-scheduled time period. For example, unexpected news broadcasts, program cancellations, time overruns of previous live events, and other similar occurrences can result in an unscheduled delay or advance in the actual broadcast time of the desired program. Although information from an electronic programming guide (EPG) can be used to determine certain of these changes, the EPG may not be updated until after the user has programmed the recording device.

In these and other situations in which programs start early or end late relative to their pre-scheduled broadcast time period, the user recording a desired program using conventional techniques can inadvertently miss a significant portion of the program. For example, in the case of the two-hour movie noted above, a relatively short delay on the order of 5 to 15 minutes in the actual broadcast time period can cause the user to miss a crucial ending scene.

A number of techniques have been developed which attempt to solve the above-described problem. For example, U.S. Pat. No. 5,440,400, entitled "Device for Programming of Recording By Reference Signals Recognition," describes a technique which compares a stored reference picture with input video frames in order to detect the beginning of a program. However, the reference picture generally must be made available in some manner, e.g., via transmission in a broadcast stream. As a result, this technique is generally unable to provide suitable automatic detection of actual program start and end times.

U.S. Pat. No. 5,659,653, entitled "Method for Programming a Recording Device and Programming Device," describes a technique in which program-related data transmitted in the broadcast stream are evaluated and stored when a user presses a LEARN button on a remote control. The program-related data identifies the broadcast time, date and channel of a corresponding program, and the extracted data is used to program a VCR to record that program. This technique allows a user to select a given program for future recording when a commercial for that program is aired prior to the broadcast of the program. However, it generally requires that the program-related data be broadcast to the user, and therefore cannot be implemented in a fully automatic manner, e.g., without the need for a broadcast provider to insert additional information into the broadcast.

U.S. Pat. No. 5,758,009, entitled "Video Recording Control Device," describes a technique in which a recording device is controlled based on elapsed broadcast time information of a program, as contained in an Extended Data Service (EDS) signal superimposed on a received television signal during its vertical blanking interval. Again, this technique requires the insertion of additional information into the broadcast, and therefore cannot be implemented in a fully automatic manner.

As is apparent from the above, a need exists for improved techniques for controlling video recording devices such that recording of a given program can begin prior to or extend beyond a preset recording time period.

SUMMARY OF THE INVENTION

The invention provides improved techniques for controlling the recording of broadcast programs.

In accordance with the invention, a video signal is processed to generate one or more signatures associated with a broadcast program to be recorded by a recording device. The signatures are then further processed, e.g., compared with known stored information regarding the broadcast program, so as to determine an actual start time and end time of the program. One or more of the extracted signatures may be based at least in part on, e.g., a keyframe similarity measure, a color histogram or other type of feature histogram, one or more detected commercials, a transcript, a program logo or other detected object, detected text, and a sign-on or sign-off of the desired program, as well as appropriately weighted combinations of these and other features of the broadcast program.

Advantageously, the invention allows the precise start and end times of broadcast programs to be determined, such that a recording device can be controlled to record the programs in their entirety despite delays or other changes in pre-scheduled broadcast time slots. Unlike conventional techniques, the invention does not require a broadcast provider to insert any additional information in the broadcast. The techniques of the invention can therefore be implemented in a fully automatic manner, using only the existing information already present in the broadcast. These and other features and advantages of the present invention will become more apparent from the accompanying drawings and the following detailed description.

DETAILED DESCRIPTION OF THE INVENTION

Figure 1:
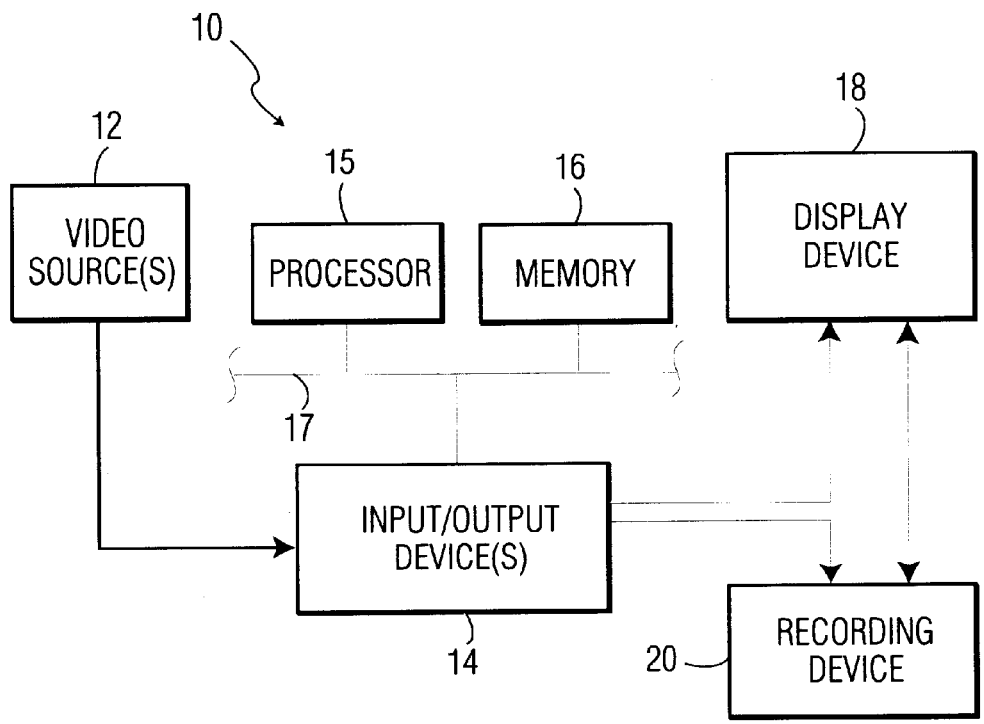
FIG. 1 is a block diagram of a video processing system in which the invention may be implemented.

FIG. 1 shows a video processing system 10 in which recording techniques in accordance with the present invention may be implemented. As will be described in greater detail below, the system 10 may represent or incorporate a television, a set-top box, a desktop, laptop or palmtop computer, a personal digital assistant (PDA), a video storage device such as a videocassette recorder (VCR), a digital video recorder (DVR), an optical disk, magnetic disk or solid state based recorder such as a TiVO or ReplayTV device, etc., as well as portions or combinations of these and other devices.

The system 10 includes one or more video sources 12, one or more input/output devices 14, a processor 15 and a memory 16. The video source(s) 12 may represent, e.g., a television receiver, a VCR or other video storage device, or any other type of video source. The source(s) 12 may alternatively represent one or more network connections for receiving video from a server or servers over, e.g., a global computer communications network such as the Internet, a wide area network, a metropolitan area network, a local area network, a terrestrial broadcast system, a cable network, a satellite network, a wireless network, or a telephone network, as well as portions or combinations of these and other types of networks.

The input/output device(s) 14, processor 15 and memory 16 communicate over a communication medium 17. The communication medium 17 may represent, e.g., a bus, a communication network, one or more internal connections of a circuit, circuit card or other device, as well as portions and combinations of these and other communication media. Input video from the source(s) 12 is processed, e.g., in accordance with one or more software programs stored in memory 16 and executed by processor 15, or using dedicated hardware or firmware configured to operate in like manner, in order to generate output video which is supplied to a display device 18, which may be, e.g., a television display, a computer monitor, etc.

It should be understood that the particular configuration of system 10 as shown in FIG. 1 is by way of example only. Those skilled in the art will recognize that the invention can be implemented using a wide variety of alternative system configurations.

The present invention provides improved techniques for controlling the recording of video, e.g., broadcast programs received in the system 10 of FIG. 1, such that a desired program can be recorded in its entirety despite delays or other changes in the pre-scheduled broadcast time of the program. Advantageously, the techniques of the invention can be implemented in a fully automatic manner based on existing broadcast video signals, i.e., without the need for the broadcast provider to include additional information in the broadcast video signals. The techniques of the invention can also be used, e.g., to override potentially erroneous meta data or other additional information in the broadcast video signals.

Figure 2:
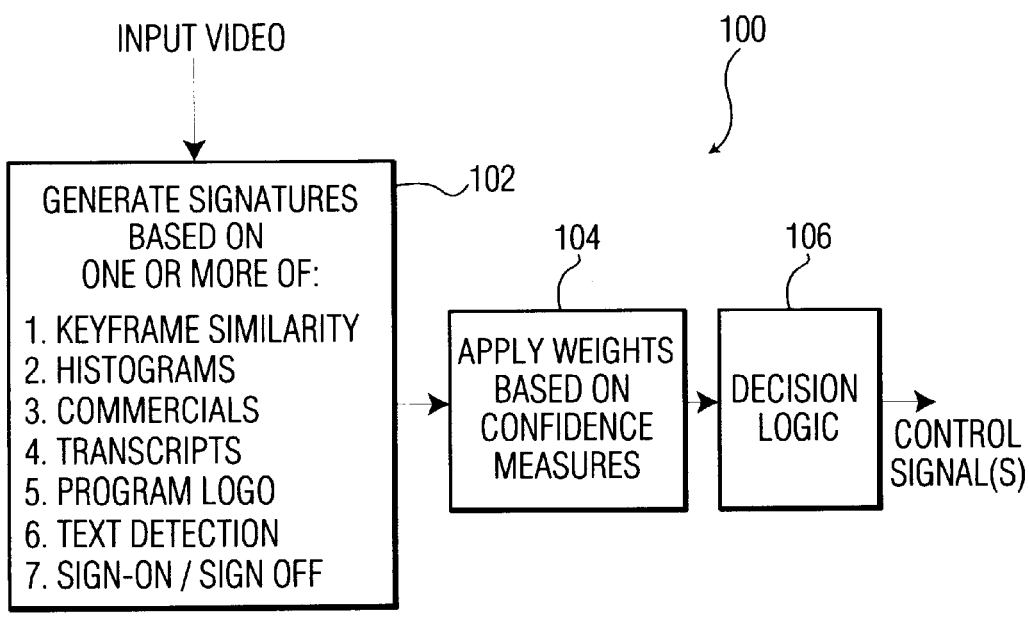
FIG. 2 is a diagram of a recording process in accordance with an illustrative embodiment of the invention that may be implemented in the video processing system of FIG. 1.

FIG. 2 shows a diagram of an example recording process 100 in accordance with an illustrative embodiment of the invention. The process 100 in this embodiment includes a signature generation operation 102, a weighting operation 104, and decision logic 106. The process 100 is applied to input video, e.g., input video which includes at least a portion of a given broadcast program to be recorded by recording device 20 of FIG. 1. In the signature generation operation 102, input video received in system 10 in the manner described previously is processed to generate one or more signatures. As will be described in greater detail below, the signatures characterize particular segments of a given received video signal, in order to determine whether a particular portion of that signal corresponds to a desired program to be recorded by the recording device 20.

At least a portion of the input video may be cached or otherwise stored in an appropriate storage device, e.g., a hard disk or other storage device associated with memory 16, recording device 20 or other element of system 10. For example, using a conventional hard disk recording device, broadcast video can be cached for a designated period of time before the pre-scheduled start time of a given program, such that signatures can be generated and used to determine the actual start time of the desired program to be recorded.

The signatures generated in operation 102 of FIG. 2 characterize the input video, and are used in subsequent operation 104 and decision logic 106 to determine whether a particular portion or other segment of the input video is associated with the program to be recorded. In this embodiment of the invention, the signatures generated in operation 102 may be based on one or more of the following: keyframe similarity, histograms, commercials, transcripts, program logo, text detection, and sign-on/sign-off. Each of these different types of signatures will now be described in greater detail, and can be used alone or in combination with other signatures to initiate recording prior to or continue recording beyond a preset time period. It should be understood that the signatures described in detail herein are intended as examples only, and other types of signatures and signature generating techniques could also be used.

1. Keyframe Similarity

A given signature of this type may be based on, e.g., a visual frame signature or an audio signature, or on other suitable identifying characteristics. The term "keyframe" as used herein refers generally to one or more frames associated with a given shot or other portion of a video signal, e.g., a first frame in a particular shot. A signature generated in operation 102 may be a keyframe similarity measure, with appearance of the particular keyframe used to control recording prior to or beyond the preset time interval. For example, the system may be configured such that recording continues as long as keyframes remain sufficiently similar to other recently-extracted keyframes. In addition, keyframes associated with commercials can be identified and ignored so as to ensure that recording is not improperly terminated in cases in which the desired program continues after the commercials. In such cases, the keyframes may appear very different for a brief time and then again revert to keyframes similar to those associated with the program. Thus, if particular keyframes appear after commercials, the recording is continued.

Keyframe similarity signatures can be extracted using, e.g., an extraction method based on DC and AC coefficients (DC+AC), an extraction method based on DC and motion coefficients (DC+M), or other suitable extraction methods, e.g., methods based on wavelets and other transforms.

The above-noted DC+AC method is described in greater detail in, e.g., N. Dimitrova, T. McGee and H. Elenbaas, "Video Keyframe Extraction and Filtering: A Keyframe is not a Keyframe to Everyone," Proceedings of ACM Conference on Information and Knowledge Management, November 1997, and may be used to generate a visual frame signature comprising, e.g., a DC coefficient and five AC coefficients.

As another example, the above-noted DC+M method may be used to generate a set of signatures of the form (keyframe1, signature1, keyframe2, signature2, etc.). This DC+M extraction method is described in greater detail in, e.g., U.S. Pat. No. 5,870,754 issued Feb. 9, 1999 in the name of inventors N. Dimitrova and M. Abdel-Mottaleb, and entitled "Video Retrieval of MPEG Compressed Sequences Using DC and Motion Signatures," and N. Dimitrova and M. Abdel-Mottaleb, "Content-Based Video Retrieval By Example Video Clip," Proceedings of Storage and Retrieval for Image and Video Databases V, SPIE Vol. 3022, pp. 59–70, San Jose, Calif., 1997.

An audio signature suitable for use in conjunction with the present invention may comprise information such as pitch (e.g., maximum, minimum, median, average, number of peaks, etc.), average amplitude, average energy, bandwidth and mel-frequency cepstrum coefficient (MFCC) peaks. Such a signature may be in the form of, e.g., a single object A1 extracted from the first few seconds of a program. As another example, the audio signature could be a set of audio signatures {A1, A2, . . . An} extracted from a broadcast program for multiple intervals, e.g., the first two seconds of every minute. Such audio signatures can be used to detect changes associated with the beginning or end of a program, e.g., changes in audio volume typically associated with a commercial, or changes in audio at the end of a program.

2. Histograms

Histograms may be used to determine, e.g., the color similarity of particular frames or keyframes in the input video. A histogram may be viewed as a particular example of the above-noted keyframe similarity measures. The desired program to be recorded may have a particular type of color histogram or other histogram associated therewith, such that the histogram can be computed and used to detect an actual start or end of the program. For example, if the desired broadcast program corresponds to a soccer game, football game or baseball, game, a color histogram of the corresponding keyframes is likely to be dominated by the color green. Therefore, a recording device may be directed to continue recording beyond a preset time period if a histogram of the video signal taken at or after the end of the preset period indicates that it continues to have the characteristic associated with the desired program. In this case, the recording may continue until the video signal no longer exhibits the characteristic histogram for a designated period of time.

It is also possible that histograms may be determined and stored for certain programs that the user will be likely to record. For example, a particular television news program may have a certain type of histogram, while a particular situation comedy has a very different type of histogram. Therefore, once the user identifies the program to be recorded, the system can retrieve the corresponding stored histogram, and control the recording such that recording takes place as long as the input video matches the stored histogram. Or the stored histogram may be representative of only the beginning and ending segments of the program, such that it is used to initiate and terminate recording.

Additional details regarding color histograms suitable for use with the present invention are described in, e.g., N. Dimitrova, J. Martino, L. Agnihotri and H. Elenbaas, "Color Super-histograms for Video Representation," IEEE International Conference on Image Processing, Kobe, Japan 1999.

Other types of feature histograms may be used in place of or in conjunction with color histograms.

3. Commercials

Commercials usually occur prior to the start of and after the end of a program. Detection of commercials can therefore be used to provide an indication of the beginning and end of a program. For example, in a case in which a desired program to be recorded extends beyond the end of a preset time period, there may be a detectable absence of high cut rate activity, black frames, or other characteristics normally associated with the presence of commercials. Therefore, recording can be extended beyond the preset time period in this case, until such time as the high cut rate, black frames or other characteristics are detected. In addition, at or near the beginning of the program, the system could be configured to look for the end of a commercial, since commercials precede a program.

The system could also be configured to utilize a content model in which commercial breaks occur at expected intervals and for expected durations. Such content models can be used in identifying the start or end of particular programs. For example, for a Star Trek program, a corresponding content model may indicate that there is typically a 2–4 minute first scene, followed by opening credits, followed by 6 minutes of commercials, etc.

Exemplary commercial detection techniques suitable for use in conjunction with the present invention are described in greater detail in, e.g., U.S. patent application Ser. No. 09/417,288 of N. Dimitrova et al., filed Oct. 13, 1999 and entitled "Automatic Signature-Based Spotting, Learning and Extracting of Commercials and Other Video Content," which is incorporated by reference herein.

Examples of signatures suitable for use in detecting commercials include an absence of closed caption information combined with a high cut rate, closed caption information containing multiple blank lines, a sequence of unicolor or black frames, an average keyframe distance or average cut frame distance trend, e.g., an increasing or decreasing trend, an absence of superimposed video logos identifying the broadcaster, different font types, sizes and colors for superimposed text, and rapid changes in color palette or other color characteristic.

4. Transcripts

Programs usually begin and end with an audio announcement, e.g., an announcement for a future program, particularly in the case of movies, situation comedies, etc. Transcripts of the corresponding audio track can be generated using techniques such as speech recognition or detection of closed caption information. A future program announcement in such a transcript can be examined to determine that the desired program has in fact ended, such that recording can be terminated accordingly.

Speech-based transcripts may be extracted, converted to text using known speech recognition techniques, and the resulting text analyzed against a stored text file to detect known program names, actor names, URLs, etc.

5. Program Logo

Many programs begin with a particular logo or other type of characteristic scene or object suitable for use as a program signature in accordance with the invention. Such objects can be detected and used to determine the beginning or end of a desired program. For example, the above-noted Star Trek program generally always starts with an object corresponding to an image of the spacecraft, followed by a series of face trajectories or text trajectories, and this "logo" is suitable for use as a signature that can trigger recording of the program prior to or beyond a preset recording interval. Each of a set of programs could be classified based on this information, and Hidden Markov Models or other suitable techniques used to determine which of the programs corresponds to a given input video signal. It should be noted that a wide variety of different types of objects can be detected to provide this type of signature.

6. Text Detection

Text detection can also be used to generate signatures for particular programs. For example, for starting the recording prior to the preset time period, text detection of the opening credits can be performed, with recognition of a particular text-based signature used to trigger the start of recording. In addition, the pattern of text can be tracked in order to determine whether the text is scrolling, dissolving, etc. This pattern could suggest if the detected text is associated with the credits of a program as opposed to random text of commercials.

Further processing can be implemented to recognize the characters in the text lines, so as to match the string with the name of the program to be recorded, as obtained from an electronic programming guide (EPG) or other suitable information source. A local list of program names, actor names, product names, can be stored for use in distinguishing program text from commercial text. Also, when recording beyond a preset time period, ending credits can be detected and used to trigger the termination of the recording.

In signatures based on text detection, it is also possible to use certain characteristics of the detected text to indicate opening or ending credits. For example, the font for ending credits is typically much smaller than that for opening credits. Also, the font size progressively becomes smaller in the ending credits, while the font for a title credit is generally quite large. The shrinking of the ending credits of a broadcast program to show additional information is becoming increasingly common, and can be detected and used as a signature. In addition, one can use text detection to detect back-to-back credits, e.g., ending credits followed by beginning credits, with or without one or more commercials between the credits. These and other text-related characteristics can be used as signatures in accordance with the invention.

Other examples of different types of text that can be detected and used to provide signatures included displayed text corresponding to entries in a stored text file of known company names, product or service names, 800 numbers or other telephone numbers, uniform resource locators (URLs), etc. that are associated with particular commercials or programs.

7. Sign-on and Sign-off

Most programs have a particular type of "sign-on" and "sign-off" associated therewith that may be used as a signature in accordance with the invention. For example, the sign-on and sign-off for a movie from a particular studio such as Warner Brothers, Columbia, etc. generally includes a well-recognized image associated with that studio. Similar sign-on and sign-off images are used by the production companies that produce many broadcast programs, such as situation comedies, talk shows, game shows, etc. These images can be used to detect the beginning and end of a program to be recorded.

As previously noted, the invention can also utilize numerous other types of signatures. For example, another type of signature may be in the form of a frame number plus information from a subimage of identified text associated with the frame, such as an program name, actor name, URL, etc. As yet another example, the signature could be a frame number and a position and size of a face or other object in the image, as identified by an appropriate bounding box. Various combinations of these and other types of signatures could also be used.

Referring again to FIG. 2, the signatures generated using one or more of the above-described techniques or other suitable techniques are further processed in operation 104. Operation 104 determines a confidence measure for one or more of the signatures based on factors such as the type of program to be recorded, the type of signature, and the relative merits of particular types of signatures for particular programs. A set of weights may then be generated based on the confidence measures, and applied to the signatures generated in operation 102.

The weighted sum of the information generated from the signatures for the particular input video is then applied to the set of decision logic 106. The decision logic 106 determines the beginning and end of the desired program based at least in part on the weighted sum of the signature information, and generates one or more appropriate control signals for the recording device 20 to ensure that the desired program is properly recorded.

For example, the decision logic 106 may examine the signatures and their confidence measures in conjunction with stored information, at different points in time, in order to make a decision regarding the proper time at which to start and stop the recording process. The decision logic 106 may be configured to make such decisions only in conjunction with detection of a particular pattern, e.g., a commercial, followed by credits, followed by a sign-on or one or more other signatures in a particular order.

The decision logic 106 may operate, e.g., in a look-ahead mode in which signatures previously stored for a particular period of time are compared to currently-generated signatures. As another example, the decision logic could operate in a look-ahead and look-back mode in which signatures generated for particular time slots are compared with corresponding signatures generated for preceding and subsequent time slots. Such time slots could be of a selected duration, such as one minute.

If the decision logic 106 is unsure as to whether a given program segment is associated with a given set of signatures, i.e., is unable to make an appropriate decision based only on the weighted signature information, it may request additional information from a number of different sources, such as, e.g., an external server, a user, etc.

As an example of the weighting process applied in operation 104, it may be known that for certain programs it is customary to shrink the ending credits to a font that is difficult to detect, e.g., in order to show a future program announcement. In such a case, other types of signatures should be weighed more heavily in making a decision as to whether the end of the program has been reached. As previously noted, it is also possible to detect the shrinking of the credits, with a particular weight applied to that type of signature. In a situation in which the closing credits are not detected, opening credits for a subsequent program may be detected and used to terminate the recording of the previous program.

The weighting process of step 104 may also make use of an a priori weight assignment, i.e., a particular set of predetermined weights may be used for a given program if various aspects of the program are unknown.

The above-described embodiments of the invention are intended to be illustrative only. For example, the invention can be used to implement controlled recording of broadcast programs, in any desired type of video processing system or device, and in many applications other than those described herein. The invention can also be implemented, e.g., at least in part in the form of one or more software programs which are stored on an otherwise conventional electronic, magnetic or optical storage medium or other type of memory and executed by a processing device, e.g., by the processor 15 of system 10 in FIG. 1, or by any other processor associated with the recording device 20. The invention can also be implemented at least in part using dedicated hardware or firmware that implements the processing functions described herein. These and numerous other embodiments within the scope of the following claims will be apparent to those skilled in the art.

What is claimed is:

1. A method for controlling a recording device, the method comprising the steps of:
   generating one or more signatures associated with at least a portion of a desired broadcast program to be recorded by the recording device; and controlling at least one of a start time and an end time of a recording process implemented in the recording device for recording the desired broadcast program, based at least in part on the one or more signatures;

wherein a given one of the one or more signatures associated with at least a portion of the desired broadcast program is generated by automatically extracting information from a first actual portion of the broadcast program, the first actual portion being a portion that is recorded by the recording device in recording the desired broadcast program, the extracted information being compared with stored information derived from a second actual portion of the broadcast program, different than the first actual portion, the second actual portion also being a portion that is recorded by the recording device in recording the desired broadcast program.

2. The method of claim 1 wherein the signature associated with the desired broadcast program comprises a visual frame signature based at least in part on a visual characteristic of a frame of the broadcast program.

3. The method of claim 2 wherein the visual frame signature is extracted using information based on DC and motion coefficients of the frame.

4. The method of claim 2 wherein the visual frame signature is extracted using information based on DC and AC coefficients of the frame.

5. The method of claim 1 wherein the signature associated with the desired broadcast program comprises an audio signature based at least in part on a characteristic of an audio signal associated with at least a portion of the broadcast program.

6. The method of claim 1 wherein the signature associated with the desired broadcast program is based at least in part on one or more of a keyframe similarity measure, a histogram, one or more detected commercials, a transcript, a program logo or other detected object, detected text, and a sign-on or sign-off of the desired program.

7. The method of claim 1 wherein the signature associated with the desired broadcast program comprises detected audio features.

8. The method of claim 1 wherein the signature associated with the desired broadcast program comprises detected credits.

9. The method of claim 1 wherein the signature associated with the desired broadcast program comprises a detected program transcript.

10. An apparatus comprising:
a recording device having at least one of a controllable start time and a controllable end time for recording of a desired broadcast program, wherein at least one of the start time and the end time is controlled in accordance with one or more extracted signatures generated from and associated with at least a portion of the desired broadcast program to be recorded;

wherein a given one of the one or more signatures associated with at least a portion of the desired broadcast program is generated by automatically extracting information from a first actual portion of the broadcast program, the first actual portion being a portion that is recorded by the recording device in recording the desired broadcast program, the extracted information being compared with stored information derived from a second actual portion of the broadcast program, different than the first actual portion, the second actual portion also being a portion that is recorded by the recording device in recording the desired broadcast program.

11. The apparatus of claim 10 wherein the signature associated with the desired broadcast program comprises a visual frame signature based at least in part on a visual characteristic of a frame of the broadcast program.

12. The apparatus of claim 11 wherein the visual frame signature is extracted using information based on DC and motion coefficients of the frame.

13. The apparatus of claim 11 wherein the visual frame signature is extracted using information based on DC and AC coefficients of the frame.

14. The apparatus of claim 10 wherein the signature associated with the desired broadcast program comprises an audio signature based at least in part on a characteristic of an audio signal associated with at least a portion of the broadcast program.

15. The apparatus of claim 10 wherein the signature associated with the desired broadcast program is based at least in part on one or more of a keyframe similarity measure, a histogram, one or more detected commercials, a transcript, a program logo or other detected object, detected text, and a sign-on or sign-off of the desired program.

16. The apparatus of claim 10 wherein the signature associated with the desired broadcast program comprises detected audio features.

17. The apparatus of claim 10 wherein the signature associated with the desired broadcast program comprises detected credits.

18. The apparatus of claim 10 wherein the signature associated with the desired broadcast program comprises a detected program transcript.

19. An article of manufacture comprising a machine-readable medium containing one or more software programs for controlling the operation of a recording device, wherein the one or more programs when executed implement the steps of:

generating one or more signatures associated with at least a portion of a desired broadcast program to be recorded by the recording device; and controlling at least one of a start time and an end time of a recording process implemented in the recording device for recording the desired broadcast program, based at least in part on the one or more signatures;

wherein a given one of the one or more signatures associated with at least a portion of the desired broadcast program is generated by automatically extracting information from a first actual portion of the broadcast program, the first actual portion being a portion that is recorded by the recording device in recording the desired broadcast program, the extracted information being compared with stored information derived from a second actual portion of the broadcast program, different than the first actual portion, the second actual portion also being a portion that is recorded by the recording device in recording the desired broadcast program.

20. An apparatus comprising:
a storage device for storing signature information relating to a desired broadcast program; and a recording device having at least one of a controllable start time and a controllable end time for recording of a desired broadcast program, with at least one of the start time and the end time controlled in accordance with one or more signatures associated with at least a portion of the desired broadcast program to be recorded, based at least in part on a comparison of the one or more signatures with the stored signature information;

wherein a given one of the one or more signatures associated with at least a portion of the desired broadcast program is generated by automatically extracting information from a first actual portion of the broadcast program, the first actual portion being a portion that is recorded by the recording device in recording the desired broadcast program, the extracted information being compared with stored information derived from a second actual portion of the broadcast program, different than the first actual portion, the second actual portion also being a portion that is recorded by the recording device in recording the desired broadcast program.

* * * * *